United States Patent [19]

Bowman et al.

[11] Patent Number: 4,979,294
[45] Date of Patent: Dec. 25, 1990

[54] BOILER TUBE REPAIR METHOD

[75] Inventors: Paul W. Bowman, Aberdeen, Ohio; Andrew F. Estill, Augusta, Ky.; Michael D. Gatherwright, Manchester; Robert L. Smith, Winchester, both of Ohio

[73] Assignee: The Dayton Power & Light Company, Aberdeen, Ohio

[21] Appl. No.: 380,988

[22] Filed: Jul. 17, 1989

[51] Int. Cl.⁵ .................................................. B23P 7/00
[52] U.S. Cl. ........................... 29/890.031; 29/402.08; 29/402.13; 29/426.4; 29/428
[58] Field of Search ............. 29/157.4, 402.08, 402.13, 29/426.4, 463, 428, 26 B, 890.031; 228/119, 183; 409/178, 180, 181; 408/88, 72 R; 285/15

[56] References Cited

U.S. PATENT DOCUMENTS

| | | | |
|---|---|---|---|
| 2,196,464 | 4/1940 | Johanson | 29/402.13 |
| 3,807,024 | 4/1974 | Harvey et al. | |
| 3,935,788 | 2/1976 | Gilmore | 409/178 |
| 3,962,767 | 6/1976 | Byerley et al. | |
| 4,047,659 | 9/1977 | Vucic | |
| 4,136,596 | 1/1979 | Davis, Jr. | 411/360 |
| 4,405,256 | 9/1983 | King, Jr. | 411/360 X |
| 4,461,603 | 7/1984 | Klee et al. | 408/72 R |
| 4,565,470 | 1/1986 | Karlsson | 408/72 R |
| 4,739,688 | 4/1988 | Berman et al. | 29/402.08 |
| 4,762,266 | 8/1988 | Schröder et al. | 29/402.13 |
| 4,844,322 | 7/1989 | Flowers et al. | 29/402.13 X |

FOREIGN PATENT DOCUMENTS 683295 3/1964 Canada .................................. 411/43

OTHER PUBLICATIONS

National Board Inspection Code, III Repairs & Alterations to Boilers & Pressure Vessels by Welding, Dig. 8 Tube Window Patching Method.

Primary Examiner—Howard N. Goldberg
Assistant Examiner—I. Cuda
Attorney, Agent, or Firm—Killworth, Gottman, Hagan and Schaeff

[57] ABSTRACT

An improved method for the speedy and efficient repair of tubes contained in a furnace boiler waterwall involves milling an elongated slot at each end of a damaged tube section in a water wall, which section is thereafter cut away and replaced with a replacement tube section having elongated slots milled at each end which are cut to mate to existing tubes. The replacement tube section and existing tubes are aligned to form elongated slots through which interior welds are made to secure the replacement tube section. The elongated slots are then closed with covers cut from a second section of replacement tubing, and the water wall web is attached to the replacement tube section to complete the repair. Also disclosed are a milling machine used to mill the elongated slots, and drill and saw fixtures to aid in cutting away the damaged tube section. The improved method and apparatus enhance the precision and uniformity with which boiler tube repairs may be made, increase access to perform internal welds in boiler tubes and permit some prefabrication of necessary repair parts, thus reducing furnace down time for repair.

15 Claims, 9 Drawing Sheets

BOILER TUBE REPAIR METHOD

BACKGROUND OF THE INVENTION

This invention relates to the maintenance of furnace boiler water walls and, in particular, to a method and apparatus for the repair of boiler tubes in water walls.

Furnace boiler water walls are used in commercial power plants, and are typically comprised of a plurality of boiler tubes joined by web sections. As is well known, leaks eventually develop in the tubes which require repair. It is desirable to cut out the leaking, damaged sections of the tubes and replace these sections completely from outside of the boiler furnace. By eliminating the need to enter the boiler to weld sections of replacement tube in place, personnel safety is improved and boiler down time is decreased.

In prior art repair methods, once the damaged tube section and adjacent web material is cut out, welding of the a section of replacement tube from outside the boiler furnace is typically accomplished through windows cut in both ends of the section of replacement tube and existing tube ends. Internal welding of the section of replacement tube to existing tubing is accomplished through these windows. Patches or covers are then welded in place to close the windows and the web section is repaired.

Vucic, U.S. Pat. No. 4,047,659 is directed to a method of repairing water carrying tubes in a gas hood for a steel furnace. Vucic discloses tack welding a section section of replacement tube in place and thereafter cutting circular windows in the assembly by means of a circular cutter. Each window is cut at the point of connection between the existing tube and section of replacement tube. Internal welding of the section of replacement tube to the existing tube is then accomplished through the windows as before, and circular covers are welded into place and the web repaired.

Vucic's method was an improvement over the prior practice of hand cutting individual square or round windows and covers. Several drawbacks in this method, however, leave further improvement desirable. The small size of the hole which results restricts access to the interior of the tubes needed to make internal welds. Further to prepare the hole for welding the cover, the edges of the circular hole must be ground by hand. As well, additional web material must be cut away to use the hole cutter according to the method disclosed by Vucic.

Thus, while the prior art methods permit repair of leaking or damaged water wall tubes from one side, for example, outside a boiler furnace, improvements in technique are needed and desired to decrease furnace down time and eliminate problems with existing methods.

SUMMARY OF THE INVENTION

The present invention addresses these needs by providing an improved method and apparatus for the speedy and efficient repair of boiler tubes.

The method and apparatus of the present invention expedites the repair process by using various tools and fixtures to enhance the precision and uniformity with which boiler tube repairs may be made. As a result, the invention permits a significant reduction in boiler down time to effect boiler tube repairs.

In particular, repair is expedited by using a milling machine to mill elongated slots at each end of a tube section which is to be replaced in a boiler water wall. Before or after milling, a drill and drill fixture are used to make starter holes for cutting the boiler tube at each end of the damaged section. A saw blade is then inserted in the hole and, with the aid of a saw fixture the saw cuts the tube transversely through the midline of the elongated slots. The milling machine, drill fixture, and saw fixture are all mounted upon studs which are located by a template and welded, at the outset, to the web. Finally, the damaged tube section is removed by cutting the web along the edges of the damaged tube section. After the damaged tube section is removed, the ends of existing tubes are then beveled in preparation for installing a section of replacement tube.

The section of replacement tube is prepared by obtaining replacement tubing in excess of the actual length needed, milling two elongated slots therein at the desired distance apart, and cutting the tube transversely through the midline of the slots to result in a replacement tube of desired length. Half of an elongated slot remains at each end, and the ends are beveled in anticipation of attachment to existing tubes by welding.

The remaining halves of elongated slots in the existing tubes and the section of replacement tube are aligned to form elongated slots and the joint between the existing tubes and section of replacement tube are welded along the inside. Access to make the welds is through the windows formed by the elongated slots.

Close fitting covers for the elongated slots are made by cutting a second section of replacement tube with a hole saw. Edges of the covers are beveled, first using a fixture with a band saw, and then grinding by hand to finish the bevel to the desired angle. A cover is then welded over each elongated slot formed by the existing tubes and the section of replacement tube, and the web is then welded along the edges of the section of replacement tube to finish the repair.

It is an object of the present invention to improve the speed at which boiler tube repairs may be made. Not only do the present method and related apparatus provide an elongated slot, enhancing access to make internal welds, the uniformity with which the slot may be milled permits the covers and at least one end of the section of replacement tube to be pre-fabricated and ready when the need for repair arises. As is preferable, the use of studs to hold the milling machine and other fixtures obviates the need to cut the web excessively in order to clamp tools around the boiler tube. The use of fixtures with tools minimizes the amount of variation in window size and saw cut alignment, and this reduces time-consuming hand work needed to fit sections of replacement tubes and, covers to existing tubes in effecting repairs. In addition, time-consuming hand grinding of the window is not required.

While the method and apparatus of the present invention have been described in connection with boiler tubes in a furnace boiler water wall, it is apparent to those skilled in the art that the invention will find application with heat exchangers, cooling hoods, shrouds, tube walls and the like. Further, while described and preferably practiced with the aid of various tool fixtures, the method of the present invention may be practiced by operating the machines and tools by hand or with the aid of other restraining devices.

DETAILED DESCRIPTION OF THE PREFERRED EMBODIMENT

Figure 1:
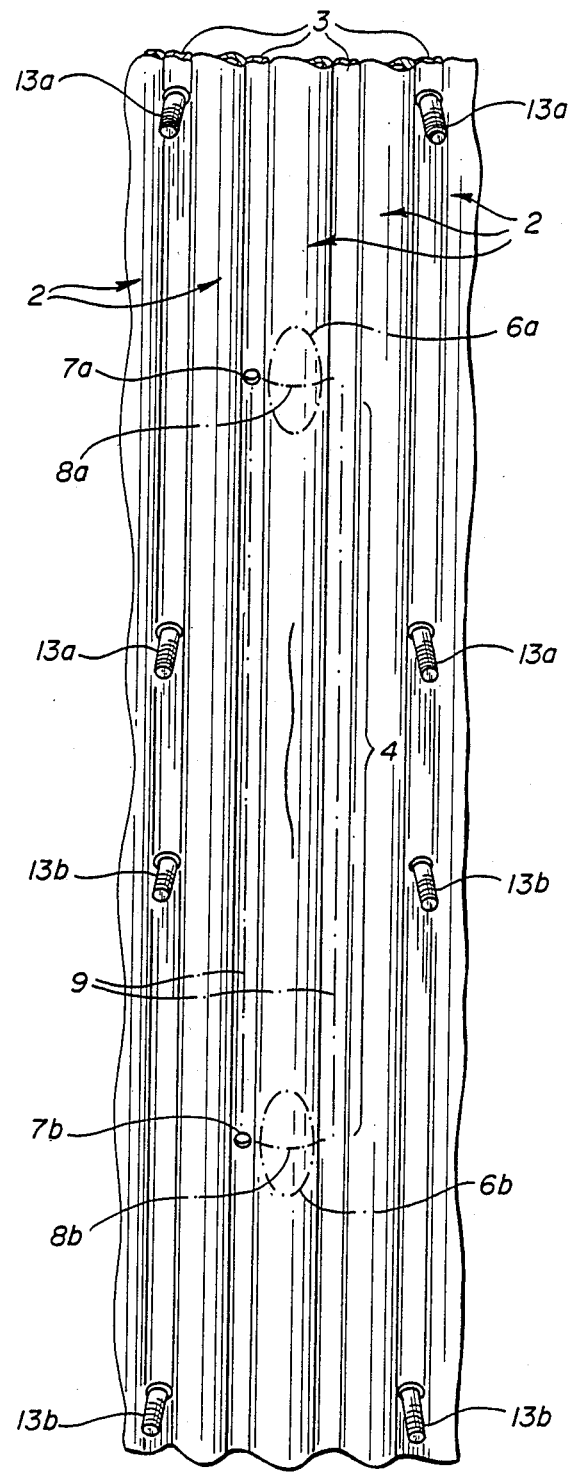
FIG. 1 is a perspective view of a leaking or damaged tube section showing the various cuts made at each end of the tube section to be replaced.
Figure 2:
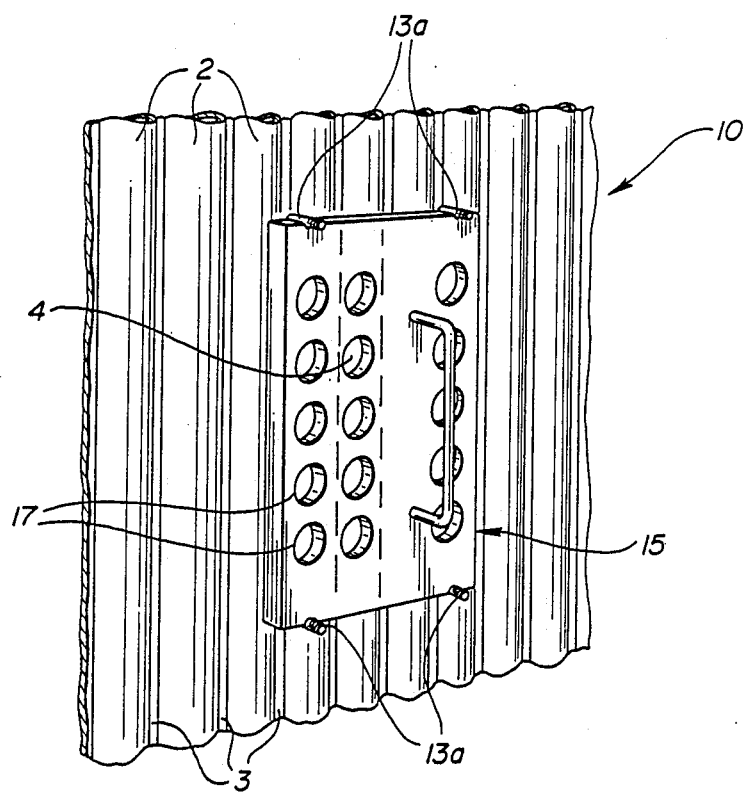
FIG. 2 is a perspective view of a furnace boiler water wall showing the use of a template to locate mounting studs.

Referring to FIG. 2, a furnace boiler water wall 10 consisting of tubes 2 joined by webs 3 is shown. While the machines used to practice the method disclosed in detail below may be hand-held or controlled in a number of ways known in the art, the preferred embodiment employs mounting studs 13a and 13b, shown typically in FIG. 1, welded at either end of damaged tube section 4 which permit the use of fixtures to control machine operation.

FIG. 2 shows the use of a template 15 to locate mounting studs 13a on water wall 10 at one end of damaged tube section 4. A second set of mounting studs 13b are similarly located by the template 15 at the other end of the damaged tube section 4. Holes 17 shown in template 15 are for weight reduction. Once welded in place, mounting studs 13a and 13b are used to hold various fixtures and machines in place as shown in FIGS. 3-5.

Figure 3:
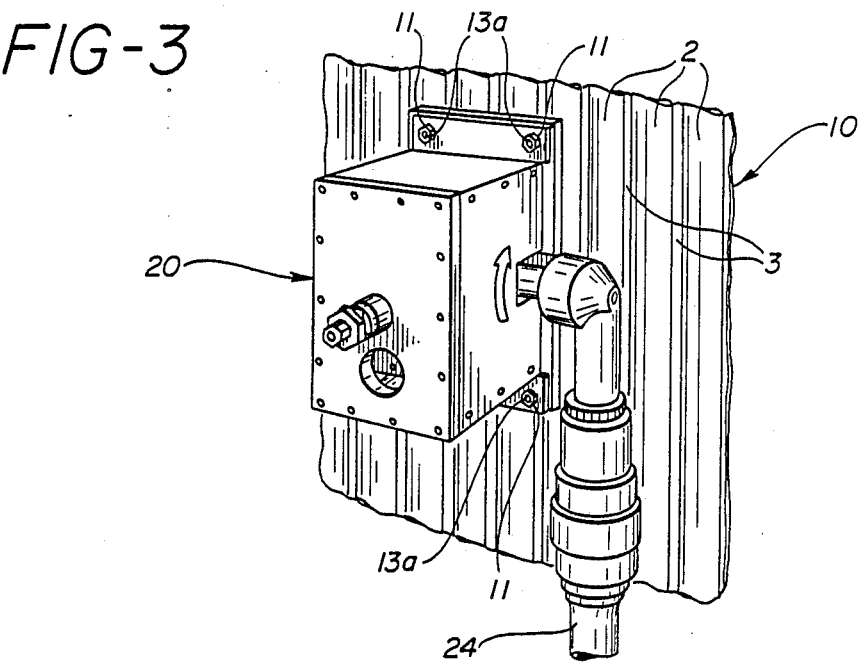
FIG. 3 is a perspective view of the milling machine and air drive used to mill elongated slots in boiler tubes, shown mounted on the furnace boiler water wall.

Accordingly, FIG. 3 shows milling machine 20 typically mounted on mounting studs 13a and held in place by conventional means such as nuts 11. As further shown in FIGS. 7 and 11, milling cutter 21 is preferably a stagger-toothed cutter as is known in the art, preferably having a width equal to the outer diameter of tube 2 and having a diameter larger than the outer diameter of tube 2, preferably 3.5 to 4.0 times larger. Milling cutters of various design and dimension, however, may be used in milling machine 20, and can be effective in practicing the method disclosed. An air driver 24 turns milling cutter 21 which mills an elongated slot in tube 2 to a desired depth, preferably half way through tube 2. Milling machine 20 is then removed and the operation repeated at the other end of damaged tube section 4.

Figure 4:
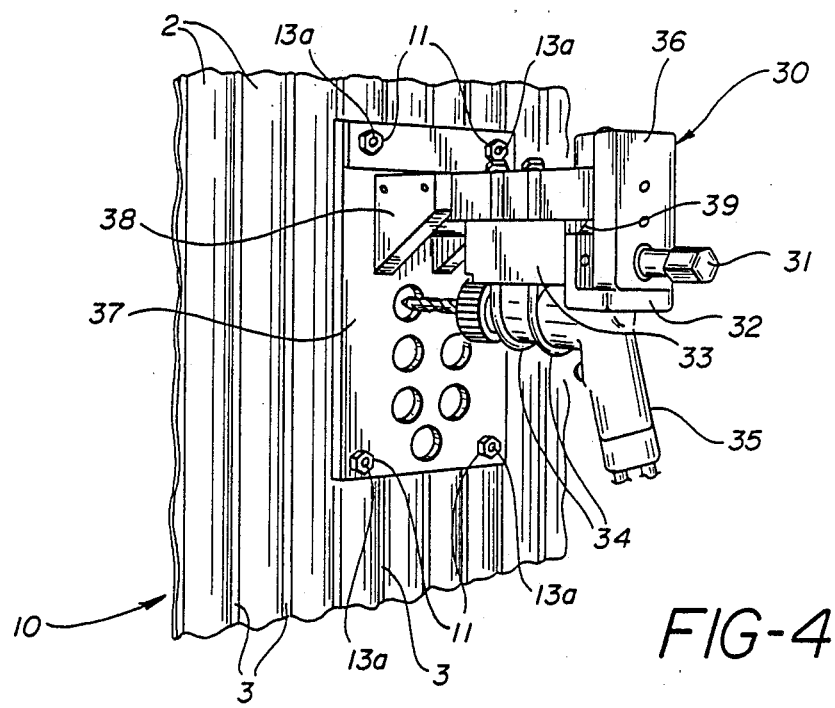
FIG. 4 is a perspective view of the drill and fixture used to make a starting hole for cutting the boiler tube.

As shown typically in FIG. 4, drill fixture 30 is mounted to water wall 10 on mounting studs 13a and attached by conventional means, such as nuts 11. Drill 35 is attached by bolts 34 to guide 33 which slides on track 39 of drill fixture 30. Drill fixture 30 is preferably made of magnesium or aluminum for light weight. In accordance with the method disclosed herein, drill 35 is brought into contact with web 3 at points adjacent to the midline of elongated slots 6a and 6b to make apertures 7a and 7b, respectively. See FIGS. 1 and 6. Apertures 7a and 7b which result serve as starting holes for saw cuts 8a and 8b shown in FIG. 1. The drilling of apertures 7a and 7b may be performed before or after the milling of elongated slots 6a and 6b.

Figure 5:
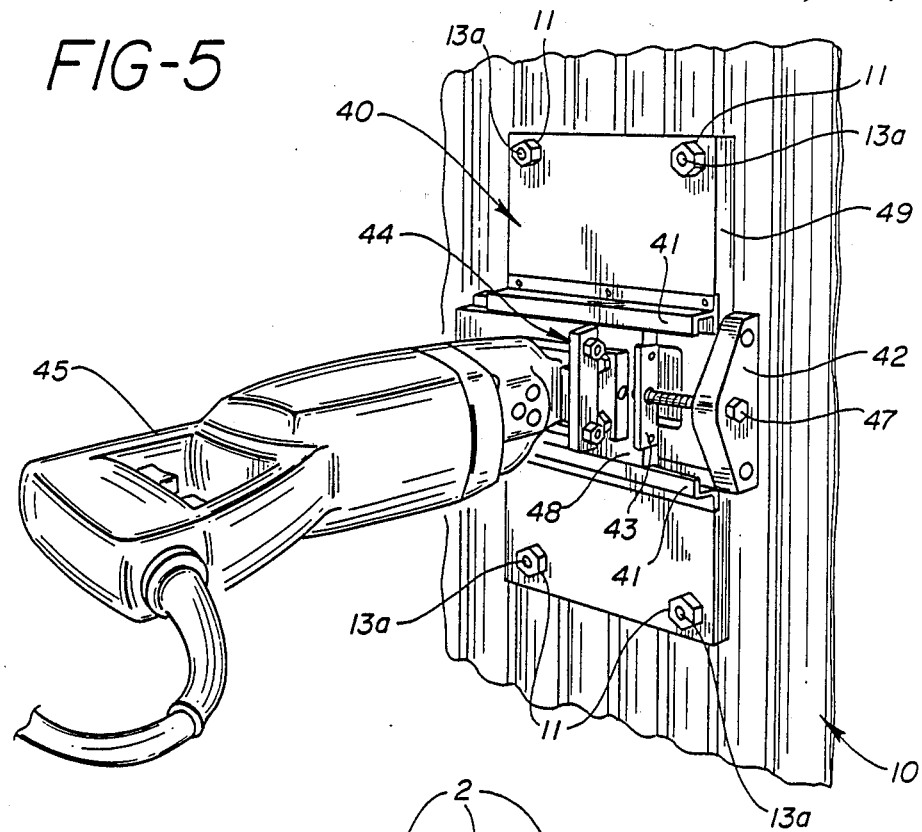
FIG. 5 is a perspective view of the saw and fixture used to cut the boiler tubes.

The next step in the present method is preferably performed as shown in FIG. 5, where saw fixture 40, preferably made of aluminum for light weight, is shown typically mounted on mounting studs 13a and secured by conventional means such as nuts 11. Saw 45, attached to support bracket 44 by conventional means and mounted on guide 48, slides along track 41 to cut tube 2 transversely across the midline of the elongated slot 6. This operation is repeated at the other end of damaged tube section 4.

Figure 6:
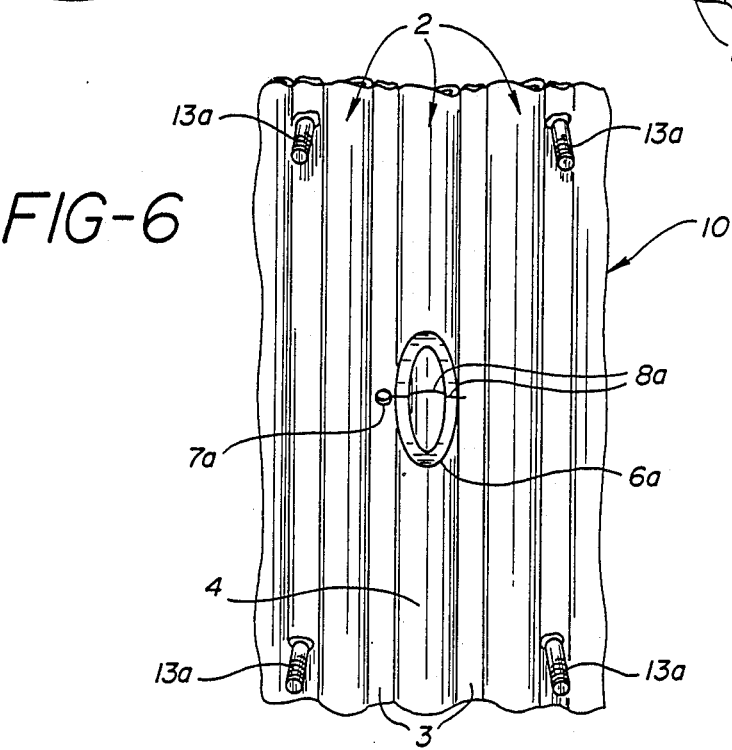
FIG. 6 is a front elevational view of the mounting studs and cuts made by milling, drilling and sawing.

The result of milling, drilling and cutting on both ends of damaged tube section 4 is shown in FIGS. 1 and 6. The damaged tube section 4 is finally removed from water wall 10 by cutting web 3 longitudinally along the edges of damaged tube section 4, preferably by using a torch. The ends of existing tubes 2 are then beveled as is commonly known in the art, preferably by die grinding, in preparation for welding replacement of tube 22 in place. (See FIG. 10).

Figure 7:
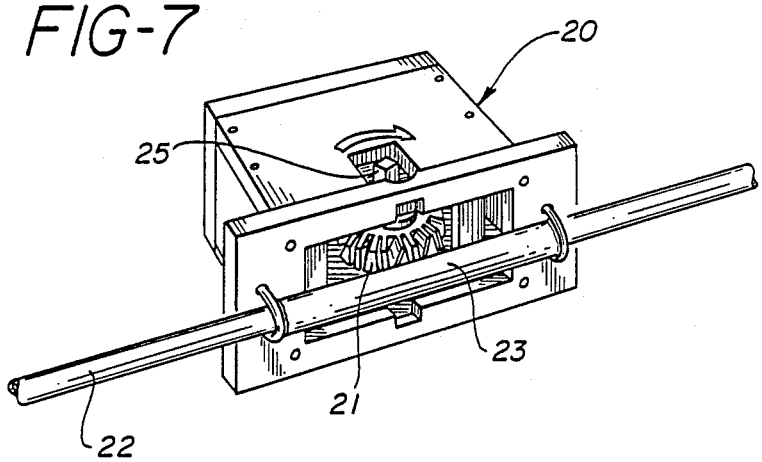
FIG. 7 is a perspective view of the milling machine and replacement tube fixture used to mill elongated slots in replacement tubing.

The method for preparing a length of tube for replacing damaged tube section 4 begins with obtaining a section of replacement tubing 22 in excess of the actual length required. As shown in Fig. 7 the replacement tube 22 is clamped to milling machine 20 with milling machine fixture 23. Replacement tube 22 is then typically clamped in a vise (not shown) or similarly restrained. Air drive 24 is attached to shaft 25 (shown in FIG. 7) to rotate milling gear 21 of milling machine 20 as in FIG. 3. A first elongated slot 26a (not shown) is then milled in replacement tube 22 to the desired depth, preferably half way through replacement tube 22. A second elongated slot 26b is milled in replacement tube 22 at the desired distance from the first elongated slot 26a so that when elongated slots 26a and 26b are cut transversely at approximately their midlines, a replacement tube 22 of the desired length is obtained. After cutting, the ends of replacement tube 22 are then beveled as is known in the art in preparation for attachment by welding to existing tubes 2.

Figure 10:
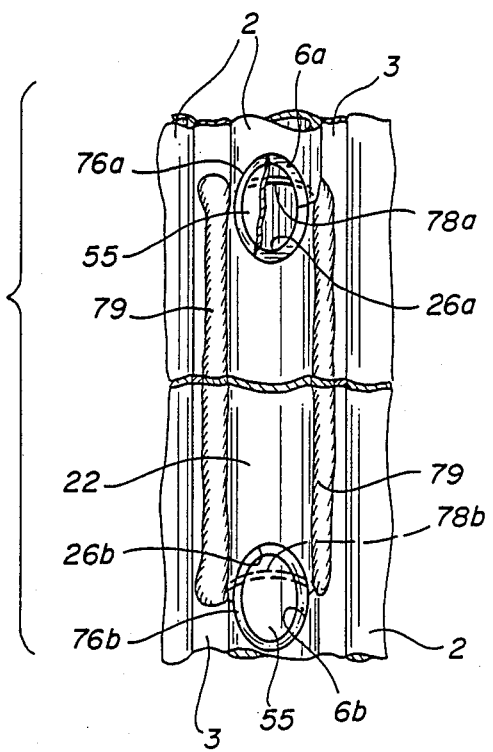
FIG. 10 is a perspective view of a repaired boiler tube in a water wall.

With reference to FIG. 10, replacement tube 22 may now be attached to tubes 2 and water wall 10 by aligning the remainder of elongated slots 26a and 26b in replacement tube 22 with the remainder of elongated slots 6a and 6b in tubes 2. Interior welds 78a and 78b are then made at the joints between tubes 2 and 22 through the elongated slots formed by the remainder of slots 6a and 26a, and 6b and 26b.

Figure 8:
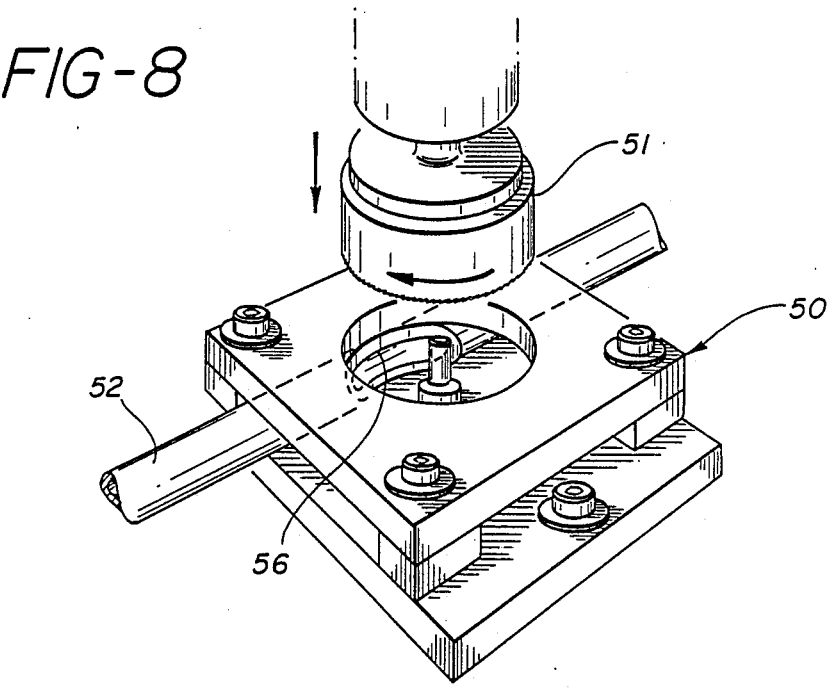
FIG. 8 is a perspective view of a hole saw and fixture used to cut covers for the elongated slots.

Covers 55 for closing the elongated slots thus formed in water wall 10 are cut from a second section of replacement tubing 52 as shown in FIG. 8. Replacement tube 52, held in hole saw fixture 50, is cut by hole saw 51. Hole saw 51 preferably has a diameter equal to that of milling gear 21, so that cutting replacement tube 52 to its center line, as is preferable, results in a cover 55 of desired shape and size, as shown in FIG. 9.

Figure 9:
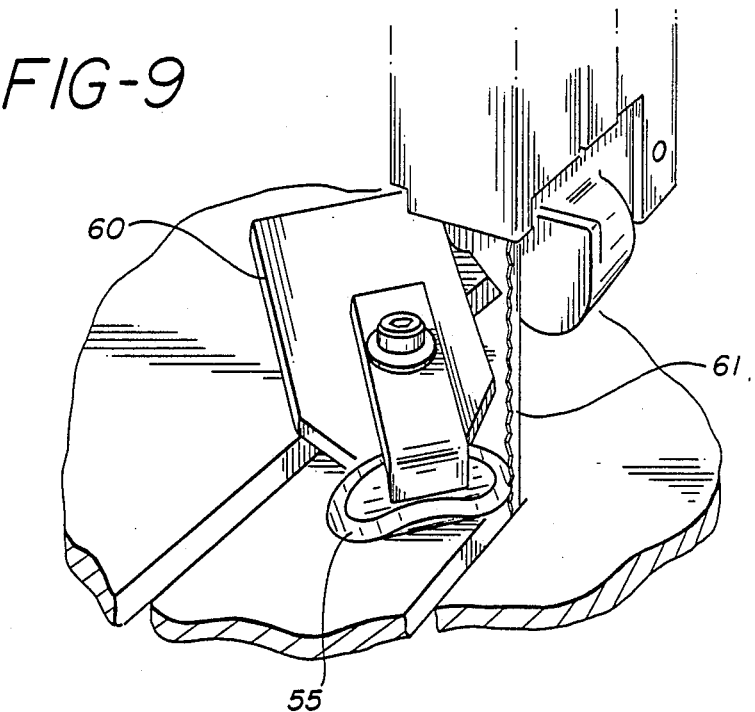
FIG. 9 is a perspective view of the cover and fixture used with a saw to bevel the cover edge.

The edges of covers 55 are beveled as shown in FIG. 9 in anticipation of welding. Beveling fixture 60 is used to hold cover 55 which is beveled along its circumference by saw 61. Additional hand grinding, as is known in the art, is preferred to increase the beveled angle on the circumference of covers 55. Covers 55 are then placed over the elongated slots formed in water wall 10 and attached, preferably by seal welds 76a and 76b, as shown in FIG. 10.

Finally, web 3 is attached along lines 79 to replacement tube 22, preferably by welding.

Figure 11:
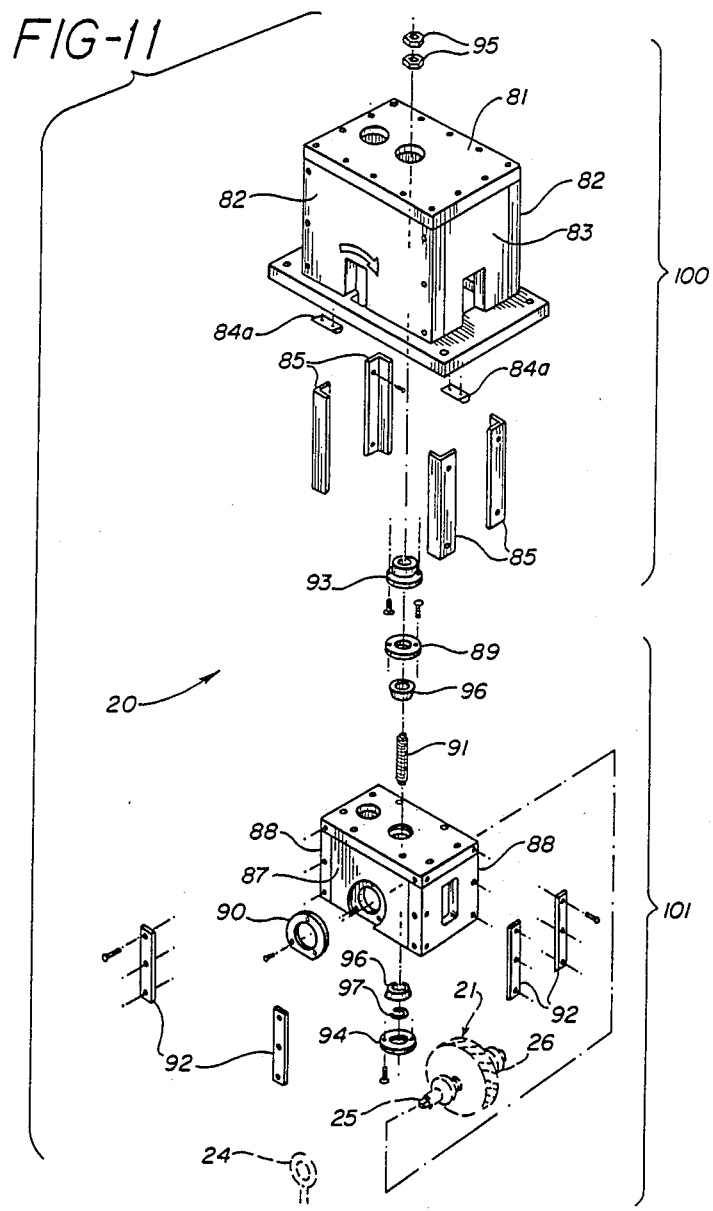
FIG. 11 is an exploded view of the milling machine.

Milling machine 20 is shown in greater detail in the exploded view of FIG. 11. Milling cutter 21 is shown mounted on shaft 25 inside assembly 101 and is supported by bearings 26 and rings 90. Assembly 101 is slidably inserted into housing assembly 100. Assembly 101 is connected to housing assembly 100 by threaded rod 91. At its first end, threaded rod 91 is rotatably inserted into top plate 86 and ring 89. Bearings 96 and 97 are fitted on this first end and maintained by conventional means such as snap ring 97 and ring 94. The position of assembly 101 inside housing assembly 100 is controlled by turning threaded rod 91 at its second end. Rotational motion of rod 91 is translated into linear motion by threaded bushing 93 which is mounted to top plate 81 of housing assembly 100. Lock nuts 95 which are used to turn threaded rod 91 manually at its second end, also serve as an adjustable stop for the downward travel of milling cutter 21. Commercially available screws, bolts and bearings are shown and used in a manner known in the art.

Figure 12:
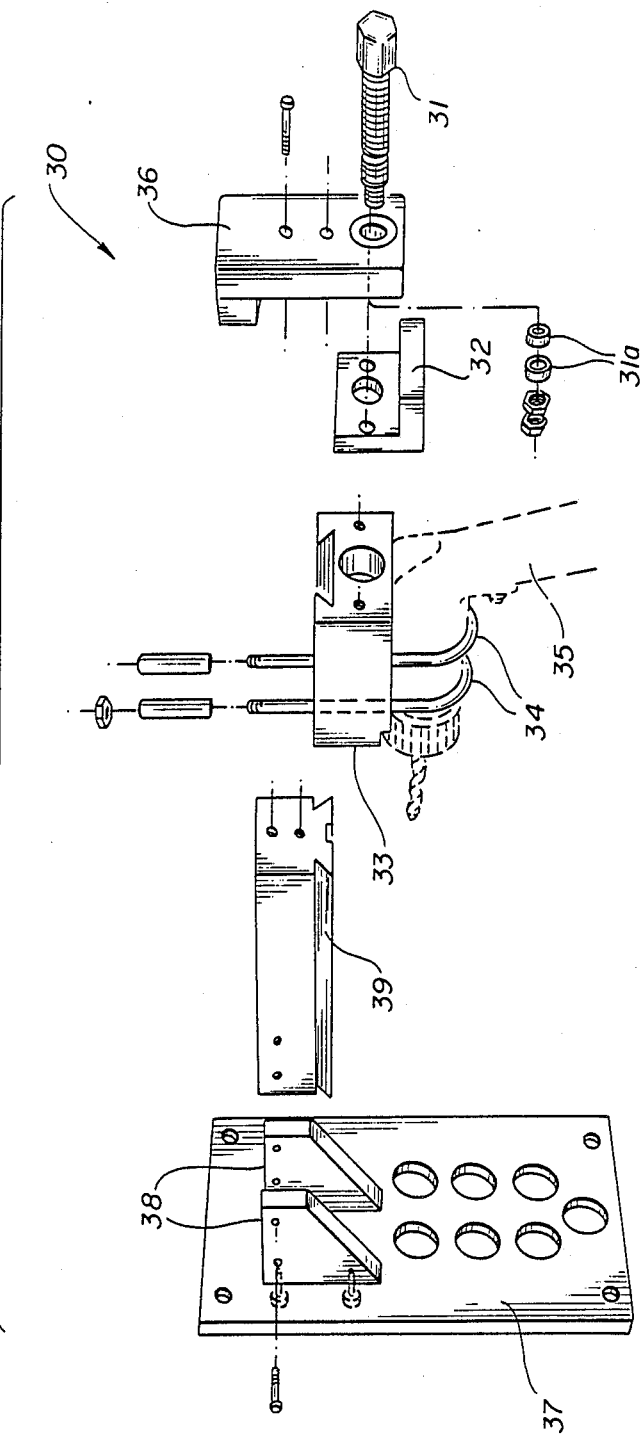
FIG. 12 is an exploded view of the drill fixture.

Referring to FIG. 12, the drill fixture 30 is shown in greater detail. Various components such as brackets 38 and 32, plates 36 and 37 guide 33 and track 39 are preferably made of aluminum or magnesium for light weight. Additionally, holes are made in plate 37 to further reduce weight of the fixture. Linear motion of drill 35 and guide 33 along track 39 is controlled with bolt 31. Bolt 31, which is threaded, passes first through a threaded hole in plate 36 and then through a hole in bracket 32. The end of bolt 31 is then rotatably inserted into bearings 31a which are held thereon by conventional means, and the bearings and bolt end are nested inside guide 33.

Figure 13:
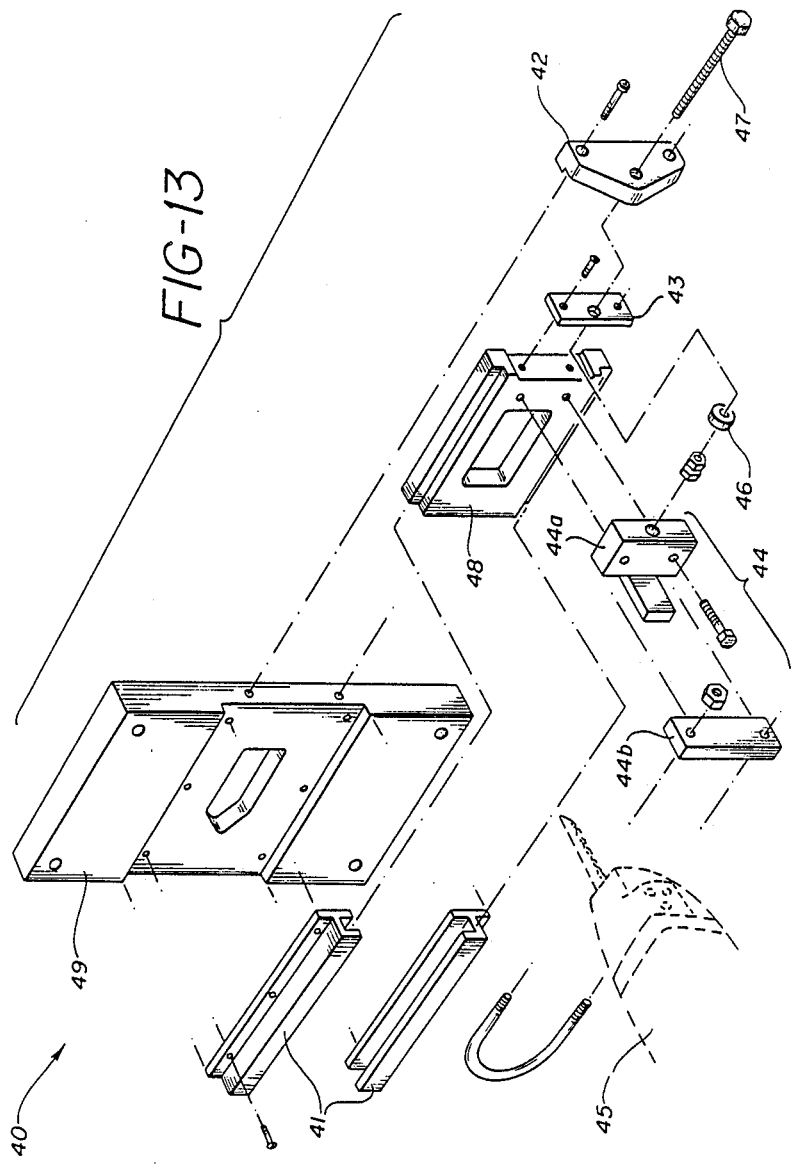
FIG. 13 is an exploded view of the saw fixture.

Finally, saw fixture 40 is shown in greater detail in FIG. 13. Again, various parts shown are preferably made of aluminum and are joined by conventional means. The movement of saw 45, support bracket 44 and guide 48 in track 41 is controlled with bolt 47. Bolt 47, which is threaded, passes through a threaded hole in plate 42 and then through a hole in plate 43. The end of bolt 47 is rotatably inserted into bearing 46 which is held thereon by conventional means, and the bearing and end are nested in support bracket 44.

While certain representative embodiments and details have been shown and described for purposes of illustrating the invention, it will be apparent to those skilled in the art that various changes of the methods and apparatus disclosed herein may be made, and that the method, preferably practiced with the aid of fixtures such as those disclosed herein, may be practiced manually or otherwise with other fixtures without departing from the scope of the invention which is defined in the appended claims.

What is claimed is:

1. A method for repairing a tube forming part of a boiler water wall having a plurality of tubes joined by web sections, said method comprising:

milling first and second elongated slots respectively, at the first and second ends of a section of an existing tube which is to be replaced in a boiler water wall;

cutting out said section of said existing tube which is to be replaced, whereby said existing tube is cut across said first and second elongated slots, leaving a portion of said first and second elongated slots in said boiler water wall, and by cutting the web sections along the edges of said section of said existing tube which is to be replaced;

milling third and fourth elongated slots at a distance apart in a length of replacement tube;

cutting said replacement tube to fit the space in said existing tube in said boiler water wall whereby said replacement tube is cut across said third and fourth elongated slots leaving a portion of said third and fourth elongated slots in said replacement tube;

aligning portions of said third and fourth elongated slots remaining in said replacement tube with respective portions of said first or second elongated slots remaining in said existing tube in said boiler water wall to form fifth and sixth elongated slots;

securing said replacement tube to said existing tube in said boiler water wall with a water-tight seal;

securing at least one cover over each of said fifth and sixth elongated slots with a water-tight seal; and securing said replacement tube to the web sections of said boiler water wall.

2. A method as recited in claim 1 wherein said step of milling said first and second elongated slots at said first and second ends of a section of existing tube which is to be replaced, further comprises, at each of said first and second end, the steps of:

locating one or more studs on said boiler water wall;

securing said studs to said boiler water wall;

mounting a milling machine on said studs; and driving said milling machine to mill said first or second elongated slot to the desired depth in said existing tube.

3. A method as recited in claim 2 wherein said step of cutting out said section of said existing tube which is to be replaced further comprises, at each of said first and second ends, the steps of:

removing said milling machine from said studs and mounting a drill and a drill fixture to said studs;

drilling a hole through a web section of said boiler water wall, whereby said hole is adjacent to said first or second elongated slot;

removing said drill and said drill fixture from said studs;

mounting a saw and a saw fixture on said studs;

inserting the blade of said saw into said hole and cutting said section of said existing tube transversely, whereby said existing tube is cut generally along the midline of said first or second elongated slot; and cutting said web sections along the edges of said section of said existing tube which is to be replaced.

4. A method as recited in claim 1 wherein said step of cutting out said section of said existing tube which is to be replaced further comprises, at each of said first and second ends, the steps of:

drilling a hole through a web section of said boiler water wall whereby said hole is adjacent to said first or second elongated slot;

inserting the blade of a saw into said hole and cutting said section of existing tube transversely, whereby said existing tube is cut generally along the midline of said first or second elongated slot; and cutting said web sections along the edges of said section of said existing tube which is to be replaced.

5. A method as recited in claim 1 wherein said step of cutting out said section of said existing tube which is to be replaced further comprises, at each of said first and second ends, the steps of:
locating one or more studs on said boiler water wall with a template;
securing said studs to said boiler water wall;
mounting a drill and a drill fixture to said studs;
drilling a hole through a web section of said boiler wall, whereby said hole is adjacent to said first or second elongated slot;
removing said drill and said drill fixture from said studs;
mounting a saw and a saw fixture on said studs;
inserting the blade of said saw into said hole and cutting said section of existing tube transversely, whereby said existing tube is cut generally along the midline of said first or second elongated slot; and
cutting said web sections along the edges of said section of said existing tube which is to be replaced.

6. A method as recited in claim 1 wherein the step of securing said replacement tube to said existing tube is done by welding.

7. A method as recited in claim 1 wherein the step of securing said replacement tube to said existing tube is done by beveling the ends of said replacement tube and beveling said first and second ends of said existing tubes and welding said ends of said replacement tube to said first and second ends of said existing tube.

8. A method as recited claim 1 wherein said step of securing at least one cover over each of said fifth and sixth elongated slots is done by welding.

9. A method as recited in claim 1 wherein said step of securing at least one cover over each of said fifth and sixth elongated slots further comprises, for each of said at least one cover, the steps of:
cutting a second section of replacement tube with a hole saw sized and positioned to obtain an elongated cover adapted to fit said fifth or sixth elongated slot;
beveling the edges of said cover; and
welding said cover over said fifth or sixth elongated slot.

10. A method as recited in claim 1 wherein said step of securing said replacement tube to the web sections of said boiler water wall is done by welding the web sections along the both edges of said replacement tube.

11. A method as recited in claim 1 wherein said step of cutting said existing tube is performed transversely, generally, across the midline of said first and second elongated slots; and said step of cutting said replacement tube is performed, generally, across the midline of said third and fourth elongated slots.

12. A method as recited in claim 1 wherein said step of milling said third and fourth elongated slots comprises milling said third and fourth elongated slots to the same depth, respectively, as said first and second elongated slots.

13. A method for repairing an existing tube contained in a boiler water wall having a plurality of tubes joined by web sections, said method comprising:
(1) locating the first and second ends of a section of existing tube which is to be replaced in a boiler water wall;
(2) performing the following steps at each of said first and second ends:
(a) milling an elongated slot in said section of existing tube;
(b) drilling a hole through a web section of said boiler water wall, whereby said hole is adjacent said elongated slot;
(c) inserting the blade of a saw into said hole and cutting said section of existing tube transversely, whereby said existing tube is cut generally along the midline of said elongated slot;
(3) cutting said web sections along the edges of said section of existing tube which is to be replaced;
(4) removing said section of existing tube to be replaced;
(5) beceling exposed ends of said existing tubes remaining in said boiler water wall;
(6) milling third and fourth elongated slots at a desired distance apart in a length of replacement tube;
(7) cutting said replacement tube to fit the space inside said existing tube in said boiler wall, whereby said replacement tube is cut generally along the midline of said third and fourth elongated slots;
(8) beveling the ends of said replacement tube;
(9) aligning said third and fourth elongated slots remaining in said replacement tube with said elongated slots remaining in said first and second ends of said existing tubes;
(10) welding said replacement tube to said existing tube at said first and second ends with watertight seals;
(11) welding at least one separate cover over each of said aligned elongated slots with water tight seals; and
(12) welding said web sections along the length of said replacement tube to said replacement tube.

14. A method as recited in claim 13 wherein said step of milling said third and fourth elongated slots comprises milling said third and fourth elongated slots to the same depth, respectively, as said elongated slots in said first and second ends of said existing tube.

15. A method for repairing an existing tube contained in a boiler water wall, said boiler water wall having a plurality of tubes joined by web sections, said method comprising:
(1) locating the first and second ends of a section of existing tube which is to be replaced in a boiler water wall;
(2) performing the following steps at each of said first and second ends:
(a) locating and securing one or more studs on said boiler water wall;
(b) mounting a milling machine on said studs;
(c) driving said milling machine to mill an elongated slot in said section of existing tube;
(d) removing said milling machine from said studs;
(e) mounting a drill and a drill fixture to said studs;
(f) drilling a hole through the web section of said boiler water wall, whereby said hole is adjacent said elongated slot;
(g) removing said drill and fixture from said studs;
(h) mounting a saw and a saw fixture on said studs;
(i) inserting the blade of said saw into said hole and cutting said section of existing tube transversely, whereby said existing tube is cut generally along the midline of said elongated slot; and
(j) removing said saw and said saw fixture from said studs;
(3) cutting said web sections along the edge of said section of existing tube which is to be replaced;

(4) removing said section of existing tube to be replaced;
(5) beveling exposed ends of said existing tube remaining in said boiler water wall;
(6) milling third and fourth elongated slots at a distance apart in a length of replacement tube;
(7) cutting said replacement tube to fit the space inside said existing tube in said boiler water wall whereby said replacement tube is cut generally along the midline of said third and fourth elongated slots;
(8) beveling the ends of said replacement tube;
(9) aligning said third and fourth elongated slots remaining in said replacement tube with said elongated slots remaining in said first and second ends of said existing tube in said boiler water wall;
(10) welding said replacement tube to said existing tube in said boiler water wall at said first and second ends with watertight seals;
(11) welding a separate cover over each of said aligned elongated slots with water tight seals;
(12) welding said web sections along the length of said replacement tube to said replacement tube.

* * * * *